Patented Nov. 19, 1940

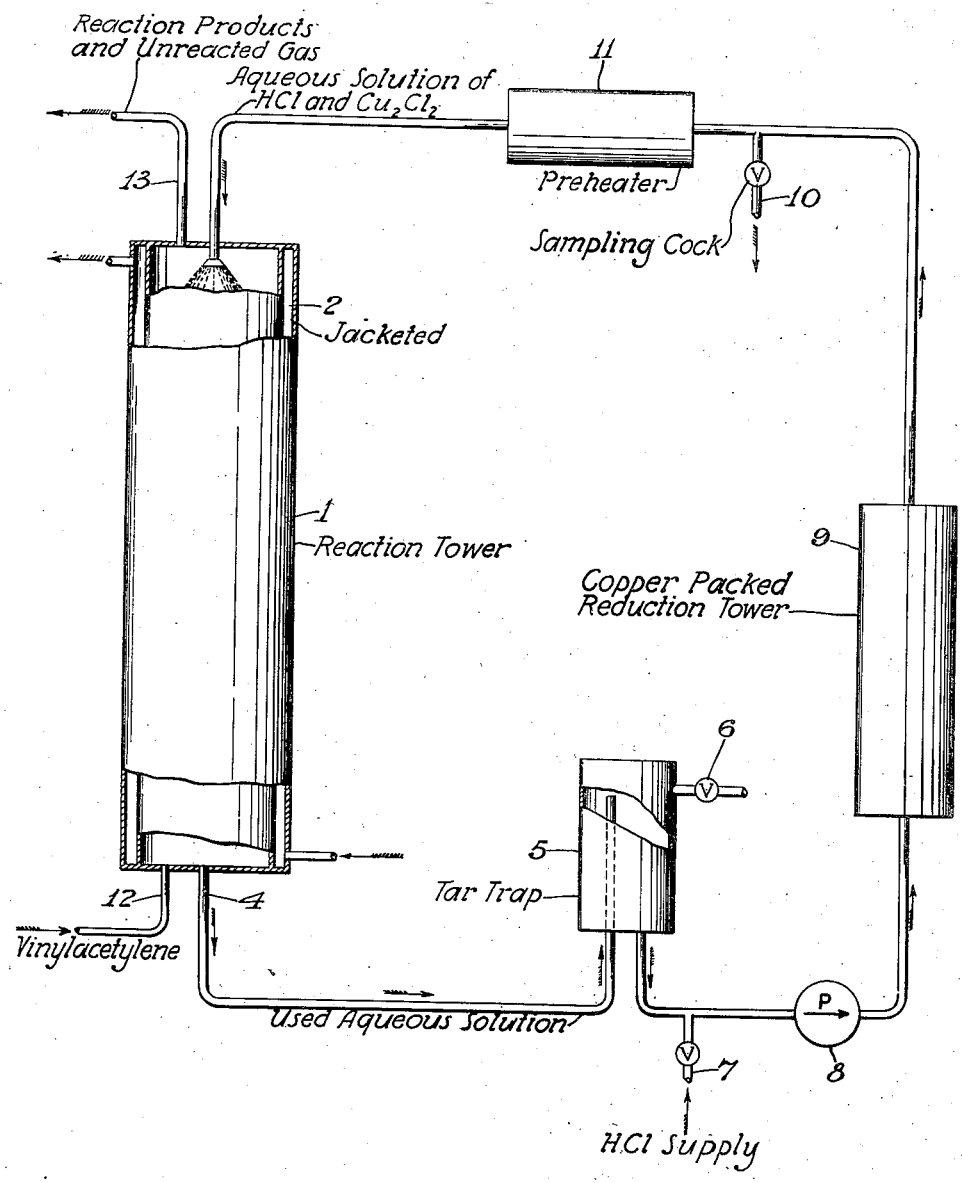

2,221,941

UNITED STATES PATENT OFFICE 2,221,941

HYDROHALOGENATION OF VINYLACETYLENE

Albert S. Carter, Wilmington, Del., and Frederick B. Downing, Carneys Point, N. J., assignors to E. I. du Pont de Nemours & Company, Wilmington, Del., a corporation of Delaware Application July 8, 1937, Serial No. 152,518

2 Claims. (Cl. 260—655)

This invention relates to the process of hydrohalogenation of unsaturated hydrocarbons and more particularly to improvements in the process for preparing 2-chloro-1,3-butadiene by the addition of hydrogen chloride to vinylacetylene.

The synthesis of chloro-butadienes by the addition of hydrogen chloride to vinylacetylene was described by Carothers and Collins (U. S. Pat. No. 1,950,431). Thus,

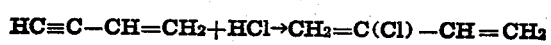

Simultaneously, a secondary reaction takes place

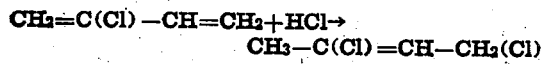

Carter, Downing and Hutton (U. S. Pat. No. 1,950,434) have described one continuous process for carrying out these reactions to control the ratio of products and give a maximum yield of the mono-chloro compound if desired. In this patent, gaseous vinylacetylene is passed over one or a succession of aqueous solutions of hydrogen chloride in the presence of a catalyst, a part of the vinylacetylene is converted and the reaction products are carried out in the excess unreacted gas.

It is an object of this invention to find an improved method of reacting vinylacetylene with a hydrogen halide of the group consisting of hydrogen chloride and hydrogen bromide. It is a further object to find a continuous method of reacting vinylacetylene with a hydrogen halide of the group consisting of hydrogen chloride and hydrogen bromide, wherein rapid degeneration of the catalyst is avoided. A still further object is a continuous process for making 2-chloro-1,3-butadiene which may be carried on efficiently for longer periods of time than the processes of the prior art. Other objects will appear hereinafter.

These objects have been accomplished by the discovery that by circulating the solution containing a hydrogen halide of the group consisting of hydrogen chloride and hydrogen bromide and a catalyst, as well as circulating the vinylacetylene, the composition of such solution may be uniformly controlled and the continuous process may be carried on efficiently for longer periods of time. The products may be more easily removed and the cost of the apparatus may be materially reduced. For the sake of brevity, the process will be hereinafter described with relation to hydrogen chloride, since 2-chloro-1,3-butadiene is, at the present time, considered the most important product. It will be understood, however, that the process is applicable using hydrogen bromide in place of hydrogen chloride.

The figure is a diagrammatic illustration of a suitable set-up for carrying out the process.

The apparatus for carrying out the process may be of any suitable design. By way of example, a preferred set-up is illustrated in the figure. The reaction is carried out in tower 1 which is maintained at a constant temperature by a suitable means, such as water jacket 2. This tower may be packed with copper or glass rings, carborundum, chain or other material suitable for packing in distillation columns which will withstand the corrosive action of hydrochloric acid. The aqueous solution containing hydrogen chloride and a catalyst is sprayed into the top of the tower at 3, flows down over the packing, leaves the column through a line, 4, at the bottom, and flows into a trap, 5, which has a cock, 6, to permit removal of accumulated chloro-butadiene and tar. Hydrogen chloride gas is introduced into the aqueous solution at 7 to compensate for that removed in the tower. Following the introduction of hydrogen chloride, the aqueous solution flows to pump, 8, by means of which it is forced through column 9, and preheater, 11, back to 3. Column 9 is packed with copper turnings. A cock is supplied at 10 from which samples may be removed to determine the acidity and control the addition of hydrogen chloride at 7. Preheater, 11, brings the catalyst to the temperature of reaction tower 1. Counter to the direction of flow of the aqueous solution, vinylacetylene enters the reaction tower at 12 and the unreacted gas together with the products of the reaction leave the tower at 13. These gases pass to condensers and well known separation apparatus, not shown, the unreacted vinylacetylene being returned to 12.

In order that the process may be more fully understood, the following specific example is given. Such example is merely by way of illustration. The invention is not limited thereto, but suitable variations may be made as will become more apparent hereinafter.

EXAMPLE

A column reactor, having a diameter equal to 36.5% of its length was packed with copper chain. While the temperature was held constantly at 50° C., the flow of aqueous solution containing hydrogen chloride and catalyst was fixed at such a speed that the entire solution was circulated through the reactor every twenty seconds, and the volume of the solution was equal approximately to 60% of the volume of the unpacked reactor. The solution consisted of 19.5% HCl, 10% Cu₂Cl₂ and 70.5% H₂O. This mixture was pumped, preheated and the HCl content maintained as previously described. Vinylacetylene was passed through the reactor at a gas velocity equal to three times the velocity of the aqueous solution. The gas effluent from the reactor column contained approximately 84% (by gas volume) unreacted vinylacetylene, 15% chlorobutadiene and 1% dichlorobutene.

For the purpose of this invention, any of the catalysts described in the prior art (for example, those disclosed in U. S. Patents 1,950,431 and 1,950,434) may be used, cuprous chloride being especially valuable. Thus, an aqueous solution containing 5 to 25% cuprous chloride, 15 to 38% hydrogen chloride and 37 to 80% water is used in the preferred embodiment of the invention, all percentages being by weight. In the discussion and claims where cuprous chloride is specified, it is assumed that the molecular formula of cuprous chloride is Cu₂Cl₂ with a molecular weight of 198.1, and the proportions of materials have been given on this basis. Ammonium chloride may also be added in a quantity up to 7.5% of the solution, but not in excess of 25% of the cuprous chloride. Metallic copper may be added to maintain the copper of the copper salt reduced to the cuprous state. However, instead of adding metallic copper to the circulating solution, it is preferred to add copper turnings, wire or even bar copper to the packing in the reactor, or to place the copper in a separate column through which the aqueous solution flows, and simply pass the solution over the metal during a portion of each cycle.

It has been stated above that the gas is carried through the reactor in a counter direction to the flow of aqueous solution containing hydrogen chloride and catalyst. For mechanical reasons, this has proved advantageous. There are theoretical reasons which have been experimentally demonstrated to give better chemical yields through the use of concurrent flow. For minimum conversion to dichloro compounds, it is advantageous to have the products in contact with the spent solution (concurrent flow) instead of the fresh solution (counter-current flow). These slight advantages have not been found to balance the mechanical advantages of counter-circulation.

The reactor temperature may be held at any point between 10° and 100° C. The range from 40° to 65° C. is especially effective, and hence preferred. Pressure assists in obtaining rapid absorption of vinylacetylene but increases the difficulty of removing the reaction products. Therefore it is preferred to operate between 600 and 1000 mm. pressure (absolute) though the advantage is recognized of higher production per unit of equipment if operated at higher pressure and with somewhat decreased chemical efficiency.

It is preferred to replace the hydrochloric acid consumed in the reaction by introducing gaseous hydrogen chloride into the spent catalyst stream during the recycling process.

The optimum velocity for gas and aqueous solution through the reaction zone is a function of the size and shape of the reaction vessel, the type of packing used therein, the concentration of hydrogen chloride and catalyst in the aqueous solution and other features such as cost of heating and desired composition of effluent gases.

In order to obtain high yields of 2-chloro-1,3-butadiene, the circulation rate of vinylacetylene must be sufficiently high to sweep out practically all of this product before substantial amounts of dichlorobutene have been formed. In other words, the vinylacetylene is passed into the reaction zone in an amount in excess of the rate at which it is consumed, and the 2-chloro-1,3-butadiene is withdrawn at a rate faster than the rate of the reaction

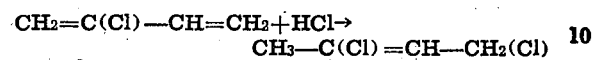

$CH_2=C(Cl)-CH=CH_2+HCl \rightarrow$
$\qquad CH_3-C(Cl)=CH-CH_2(Cl)$

The circulation rate of vinylacetylene may, of course, be considerably in excess of this necessary minimum, if desired for any reason, without materially affecting the process, but an excessively high circulation rate is thermally inefficient and results in difficult problems of condensation and fractionation.

To establish the optimum flow rate for a given apparatus of the packed tower type, the aqueous solution may be first circulated until flooding occurs. The rate is then slowly reduced until flooding ceases, thereby establishing a flow which maintains a thin layer of solution over the column packing, presenting a large surface area of solution per unit volume. The vinylacetylene may then be passed into the reaction chamber at about three times the rate of the aqueous solution. The effluent gas, comprising a mixture of unreacted vinylacetylene and reaction products, may then be analyzed and the flow of vinylacetylene adjusted until a subsequent analysis of the effluent gas shows that the desired reaction rate has been established. In general, it will be found that this reaction rate will correspond to a contact time of from 5 to 20 seconds, although the time in some cases may be beyond these limits. While the preferred mode of operation contemplates a solution flow rate less than that necessary to flood the reaction tower, nevertheless, the process is operative with a flooded tower and such operating conditions are within the scope of the invention.

As previously described, the quantity of materials converted to dichlorobutene increases with reaction time, (decrease in gas flow). The increase of reaction product is roughly proportional to the contact time. Thus, for example, with a set of operating conditions somewhat different from those set forth in the detailed example, the following conversions were obtained:

TABLE 2-chloro-1,3-butadiene production at 50° C.

| Relative gas velocity | Percent conversion to— | |
| --- | --- | --- |
|  | Chlorobutadiene | Dichlorobutene |
| 5.0 | 4.8 | 0.4 |
| 2.5 | 9.7 | 0.6 |
| 1.8 | 14.4 | 1.2 |
| 1.4 | 18.9 | 2.2 |

Among many important features of this invention, two outstanding facts are emphasized. First, the equipment is of such a nature that it may be constructed of stoneware or costly alloy metals whereas the previous equipment required large moving parts which were constructed of metals for strength and such metals as copper and copper alloys to avoid excessive cost, but which were not free from serious corrosion. Second, whereas the old methods gave approximately 100 gms. of chloro-butadiene per kg. of aqueous solution of hydrogen chloride and catalyst, this improved method produces approximately twice as much chloro-butadiene per unit weight of solution with the same yield of addition products. Based on the theory that the reaction takes place in the liquid phase by slight solubility of the vinylacetylene, this improvement is attributed to the fact that the herein described process provides a greater opportunity for the vinylacetylene to dissolve and a greater opportunity for the chloro-butadiene to leave the solution, and hence provides more rapid equilibrium between inlet gas and solution and between solution and vent gas.

It is apparent that many widely different embodiments of this invention may be made without departing from the spirit and scope thereof, and, therefore, it is not intended to be limited except as indicated in the appended claims.

We claim:

1. The process of reacting vinylacetylene with hydrogen chloride, which comprises circulating and recirculating an aqueous solution containing hydrogen chloride, cuprous chloride and ammonium chloride through a reaction zone maintained at a temperature of between 40° and 65° C., so distributing the solution in the reaction zone as to expose a large surface area per unit volume, treating the solution which leaves the reaction zone to remove tar, replenishing the hydrogen chloride content of the solution, passing it over metallic copper and preheating the solution before recirculating it through the reaction zone, passing an excess of vinylacetylene through the reaction zone counter-current to the solution at such a rate as to sweep the reaction products away with unreacted vinylacetylene before the formation of substantial amounts of products other than 2-chloro-1,3-butadiene.

2. The process of reacting vinylacetylene with hydrogen chloride, which comprises circulating and recirculating an aqueous solution containing, by weight, 15 to 38% hydrogen chloride, 5 to 25% cuprous chloride and 0 to 7.5% ammonium chloride, the amount of ammonium chloride being limited to a maximum of 25% of the amount of cuprous chloride, through a reaction zone maintained at a temperature of between 40° and 65° C., so distributing the solution in the reaction zone as to expose a large surface area of solution per unit volume, treating the solution which leaves the reaction zone to remove tar, replenishing the hydrogen chloride content of the solution, passing it over metallic copper and preheating the solution before recirculating it through the reaction zone, passing an excess of vinylacetylene through the reaction zone counter-current to the solution at such a rate as to sweep the reaction products away with unreacted vinylacetylene before the formation of substantial amounts of products other than 2-chloro-1,3-butadiene, separating the unreacted vinylacetylene from the reaction products and returning it to the reaction zone, the supply of fresh vinylacetylene being reduced by the amount thus recirculated.

ALBERT S. CARTER.
FREDERICK B. DOWNING.